Nov. 18, 1952     L. F. GOODRICH     2,618,104
FIRING OF MOLDED POWDERED GLASS ARTICLES
Filed Dec. 5, 1949

Inventor
LEVI F. GOODRICH
By Rolf E. Schneider
Attorney

Patented Nov. 18, 1952

2,618,104

UNITED STATES PATENT OFFICE 2,618,104

FIRING OF MOLDED POWDERED GLASS ARTICLES

Levi F. Goodrich, Corning, N. Y., assignor to Corning Glass Works, Corning, N. Y., a corporation of New York Application December 5, 1949, Serial No. 131,214

3 Claims. (Cl. 49—82)

1

The present invention is directed to a method of manufacturing a vitreous body, especially one having a rod-like or tubular shape, varying progressively in expansion characteristic and in softening temperature along a longitudinal axis, and is particularly concerned with an improved procedure for forming a graded seal for joining parts respectively made of glasses differing materially in coefficient of expansion and softening temperature. This application is a continuation-in-part of applicant's copending application for "Mold Charging Apparatus," Serial No. 733,232, filed March 7, 1947, now Patent No. 2,528,509, issued November 7, 1950.

One way in which such a body can be made, as set forth in the parent application, is by compacting into a self-supporting rod or tube-like shape several suitable finely divided glasses of different softening temperatures and expansion characteristics, such glasses being mixed in progressively varying proportions to provide the desired gradation in expansion coefficient, and then fusing the same into a single linear unit by firing. As will be appreciated, due to the relatively large shrinkage encountered when such an article is fired and to the relatively wide range of its softening temperature, successful firing of the compacted shape in a manner to produce a substantially uniformly symmetrical article presents particularly the problems of preventing distortion of the lower softening portions while the higher softening portions are being progressively fired, and of ironing out occasional minor distortions occurring during such firing.

The primary object of this invention, accordingly, is to provide an improved method of firing or vitrifying articles of the foregoing character rapidly and economically while preventing substantial distortion thereof.

A further object is the provision of a method of treating such an article immediately following the firing of the highest softening temperature portion thereof to impart thereto symmetrical characteristics which it may have lost during such firing.

According to the present invention, the article, following its formation from the several finely divided glasses, is successively fired from its lowest softening temperature portion to its highest softening temperature portion. After fusing of the lowest softening portion, a cooling medium is directed thereagainst as the next higher softening portion is being fired; and, as successively higher softening portions are vitrified, the cooling medium is directed against the previously fired portions to prevent their again attaining their softening temperatures. Also, in accordance with the invention, the completely fired article, preferably while it is still in workable condition, may be subjected to a straightening treatment to eliminate any minor distortions which may have resulted from the firing operation.

The accompanying drawing depicts one form of equipment by means of which applicant's invention may be practiced.

Fig. 1 diagrammatically illustrates, in sectional elevation, a lehr having a conveyor passing therethrough and carrying formed articles to be in part vitrified therein.

Figure 1:
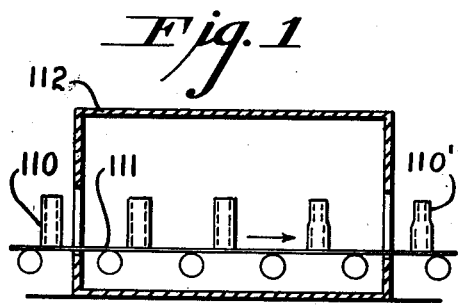

Referring now to Fig. 1, a tubular article 110, which may be composed of compressed granular particles of, for example, a relatively low-expansion glass and a 96% silica glass in varying proportions, and which may have been prepared by use of the apparatus described in parent application Serial No. 733,232, is placed on a conveyor 111 with its lowest softening temperature portion up for passage through a lehr 112. The temperature within lehr 112 is desirably maintained sufficient only to fuse the lowest softening portion of article 110; and, as the article passes through the lehr, its lowest softening portion becomes vitrified and undergoes some shrinkage. The article attains a shape generally indicated by article 110′ which has just emerged from the lehr.

Figure 2:
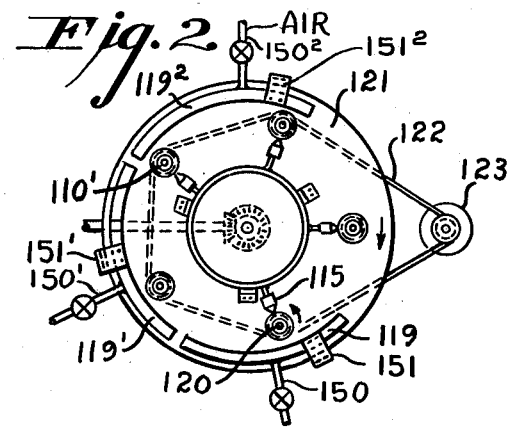
Fig. 2 is a diagrammatic plan view of a turret assembly for supporting articles and of associated means for vitrifying different portions of such articles.
Figure 3:
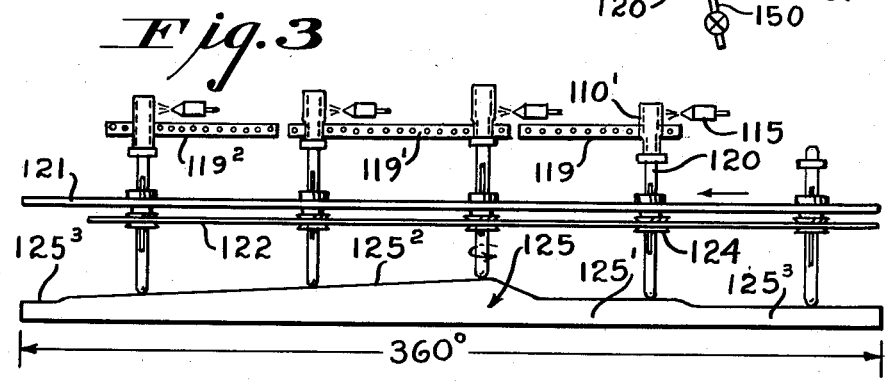
Fig. 3 is a straight-line diagram illustrating further details of the structure of Fig. 2.

The partially fired article 110′ is placed in an inverted position on a spindle 120 (Fig. 3) carried by a continuously rotating table 121 (Figs. 2 and 3) and also rotated about its own axis by a belt 122 driven by a motor 123 and trained about a pulley 124 through which the spindle is axially movable as it travels over a cam track 125. As the spindle 120 is raised by travel over cam track section 125′, a burner 115 opposite the spindle and also carried by table 121 desirably directs an intense flame against the upper end portion of article 110' to heat the same sufficiently to prevent development therein of surface checks. As the spindle rides onto cam track section $125^2$ and is raised further thereby, burner 115 directs an intense flame against the lower end of the unvitrified portion of the article 110' and is then progressively applied to the remainder of the unvitrified portion as the article is successively lowered by the travel of spindle 120 over cam track section $125^2$.

During the foregoing vitrifying process a cooling medium, such as air or steam, is directed against the lower section of the article as required to maintain its previously vitrified portions at a temperature below that at which they might collapse or sag. Such cooling medium may conveniently be supplied from the manifolds 119, 119', and $119^2$ advantageously provided with valved supply lines 150, 150', and $150^2$ respectively for ready control of the amount of cooling medium directed against article 110' during the course of its firing. Manifolds 119, 119' and $119^2$ are preferably adjustably carried by the respective supports 151, 151', and $151^2$ so that the particular portion of article 110' against which the cooling medium is directed can be selected for any given point during the rotation of table 121. With such flexibility in the possible application of the cooling medium, the overall firing of article 110' without any material distortion thereof is assured.

The temperature of the flame from burner 115 is conveniently maintained constant during the rotation of table 121, and is then perforce at least equal to the softening temperature of the highest softening portion of article 110'. The temperature of the flame may obviously be initially sufficient to fuse only the lower section of the unfired portion of article 110' however, and may then be progressively raised as it is applied to the successively higher softening portions of the article.

Figure 4:
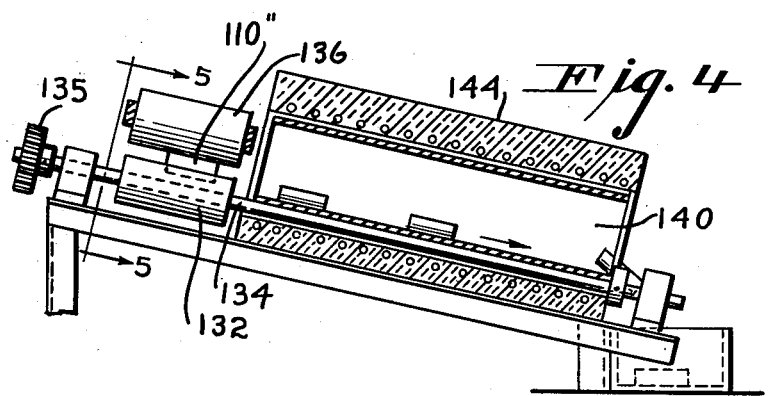
Fig. 4 is a sectional side elevation of an article straightening means and of an associated annealing lehr showing an article in the straightening means and others passing through the lehr proper.
Figure 5:
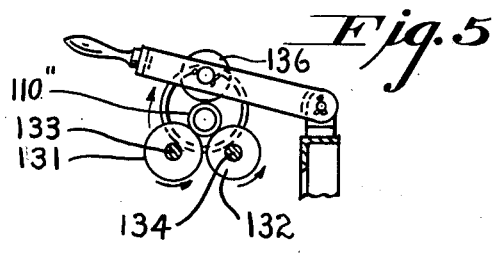
Fig. 5 is a view taken on line 5—5 of Fig. 4, illustrating operating details of the straightening portion of the structure.

As the spindle 120 rides onto cam track section $125^3$, an attendant removes the fired article 110" therefrom and places it on rollers such as 131 and 132 (Figs. 4 and 5) rotated by a gear 135 carried on one of the roller-supporting shafts 133—134, and subjects it to the pressure or bite of a roller 136, thus truing up the article while the fused glass is still workable. By the time a subsequent fired article is ready for placement on rollers 131 and 132, article 110" has fully set up and is advanced into a heated atmosphere such as a tube 140, arranged within a lehr 144 and rotatably resting on shafts 133 and 134. As the tube 140 rotates, the fired articles are annealed as they pass therethrough and are then in their finished state. If desirable or necessary, the application of the cooling medium as the spindle 120 passes over the latter stretch of cam track section $125^2$ may be so controlled as to permit the temperature of article 110' to be raised to a point where it may be more readily straightened.

The preliminary firing accomplished in lehr 112 may be omitted if desired, and an unsintered article, such as article 110, may be placed directly on a spindle 120 and progressively fired as indicated. Such procedure may result, however, in undue breakage of the relatively weak unfired articles by reason of the handling necessarily involved.

Having thus described applicant's method and a form of apparatus by means of which the method may be practiced, what is new and is desired to have protected by Letters Patent is:

1. The method of vitrifying an extended article composed of molded powdered glasses in proportions varying from a high softening temperature composition at one end to a substantially lower softening temperature composition at the other end, which comprises initially subjecting the article to a temperature sufficient to fire only the lowest softening temperature portion thereof and then successively subjecting the progressively high softening temperature portions of the article to progressively increasing temperatures to successively fire such portions while extracting sufficient heat from the previously fired portions of the article to maintain them below their softening temperatures.

2. The method of vitrifying an extended article composed of molded powdered glasses in proportions varying from a high softening temperature composition at one end to a substantially lower softening temperature composition at the other end, which comprises initially subjecting the article to a temperature sufficient to fire only the lowest softening temperature portion thereof and then successively subjecting the progressively higher softening temperature portions of the article to progressively increasing temperatures to successively fire such portions while directing a cooling medium against the previously fired portions of the article to maintain them below their softening temperatures.

3. The method as claimed in claim 2 which includes rotating the article about its longitudinal axis during the successive firing thereof.

LEVI F. GOODRICH.

REFERENCES CITED

The following references are of record in the file of this patent:

UNITED STATES PATENTS

| Number | Name | Date |
|---|---|---|
| 2,336,227 | Dalton | Dec. 7, 1943 |
| 2,463,650 | Snyder et al. | Mar. 8, 1949 |
| 2,494,582 | Prokopec | Jan. 17, 1950 |

FOREIGN PATENTS

| Number | Country | Date |
|---|---|---|
| 241,544 | Great Britain | Apr. 1, 1926 |